(12) United States Patent (10) Patent No.: US 6,750,436 B2
Feldman et al. (45) Date of Patent: Jun. 15, 2004

(54) FOCUS ERROR DETECTION APPARATUS AND METHOD HAVING DUAL FOCUS ERROR DETECTION PATH

(75) Inventors: Haim Feldman, Nof Ayalon (IL); Boris Golberg, Ashdod (IL); Alexander Libinson, Holon (IL)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/192,220

(22) Filed: Jul. 9, 2002

(65) Prior Publication Data

US 2004/0007659 A1 Jan. 15, 2004

(51) Int. Cl.$^7$ ................................. G02B 7/04
(52) U.S. Cl. ..................... 250/201.2; 396/80
(58) Field of Search ............ 250/201.2, 201.4, 250/201.5, 208.1, 216, 559.4; 396/79, 80, 82, 120, 121

(56) References Cited

U.S. PATENT DOCUMENTS 5,528,330 A * 6/1996 Utagawa ..................... 396/96

* cited by examiner

*Primary Examiner*—Que T. Le
(74) *Attorney, Agent, or Firm*—Blakely Sokoloff Taylor and Zafman (57) ABSTRACT

An apparatus and method for focus error detection operable to receive light reflected from an inspected object and to determine a focus error on a surface of the inspected object, the focus error detection apparatus including optics and at least one detection apparatus, whereas the optics and the at least one detection apparatus define at least a first focus error detection path and a second focus error detection path, the first focus error detection path detects focus errors with a greater sensitivity than the second focus error detection path, while the second focus error detection path detects focus errors over a greater focus error range than the first focus error detection path.

43 Claims, 7 Drawing Sheets

Figure 3

# FOCUS ERROR DETECTION APPARATUS AND METHOD HAVING DUAL FOCUS ERROR DETECTION PATH

FIELD OF THE INVENTION

This invention is in the field of auto-focusing techniques and relates to a method and an apparatus for determining focus error and for correcting focus errors.

BACKGROUND OF THE INVENTION

There are a great variety of optical systems used for inspection/measurements of articles, reading/recording information in an information carrier, etc. These systems typically comprise an illumination means equipped with suitable light directing optics, and a detection means equipped with light collecting optics. A system of this kind always utilizes a focus error correction technique to ensure that the article under inspection (or an addressed layer of the information carrier) is located in a focal plane defined by the light directing optics.

U.S. Pat. No. 6,124,924 of Feldman et al. (which is incorporated by reference) describes a method and apparatus for maintaining a desired position of an article, the apparatus includes: (a) an illumination apparatus generating a light beam for illuminating an elongated region of the article and producing light returned from the illuminated region; (b) a focusing optics for focusing the beam onto a focal plane and collecting at least a portion of the returned light; (c) a focus detection apparatus comprising an imaging optics and a detector, having a sensing surface responsive to light impinging thereon for generating data representative thereof, the imaging optics receiving at least a part of the collected returned light and forming first and second images on said sensing surface, wherein the first and second images are formed by first and second spatially separated substantially identical light components of the collected returned light, respectively, propagating symmetrically relative to an optical axis of said focusing optics, a position of the first image relative to the second image being indicative of the position of the article relative to the focal plane.

The apparatus of Feldman et al. offers a compromise between the focus error dynamic range and focus error sensitivity. The focus error dynamic range is limited by the size (actually height) of the sensing surface and a ratio between the focus error and the relative distance between the first and second images that result from the focus error. The focus error sensitivity is inversely proportional to the focus error dynamic range. An increase in the focus error dynamic range must be compensated by a corresponding decrease in the focus error sensitivity. The dynamic range may also be increased by increasing the sensing surface, but this may increase the size and complexity of the apparatus.

There is a need to provide a focus error detection apparatus that is characterized by large dynamic range and high sensitivity.

SUMMARY OF THE INVENTION

The invention provides a focus error detection apparatus operable to receive light reflected from an inspected object and to determine a focus error on a surface of the inspected object, the focus error detection apparatus including optics and at least one detection apparatus, whereas the optics and the at least one detection apparatus define at least a first focus error detection path and a second focus error detection path, the first focus error detection path detects focus errors with a greater sensitivity than the second focus error detection path, while the second focus error detection path detects focus errors over a greater focus error range than the first focus error detection path.

The invention provides a focus error detection method that includes the steps of: (i) receiving light that was reflected from an inspected object located at a inspected object plane; (ii) passing a first light component of the reflected light through a first focus error detection path and passing a second light component of the reflected light through a second focus error detection path; and (iii) determining a focus error in response to detection signals generated by the first and second focus error detection paths. Wherein the first focus error detection path detects focus errors with a greater sensitivity than the second focus error detection path, while the second focus error detection path detects focus errors over a greater focus error range than the first focus error detection path.

The focus error is determined in response to a location of either a first image or a second image that are formed by the first or second light component passage through the first and second focus error correction paths. Conveniently, a reference image reflecting the position of the first and second images in case of in-focus is also imaged upon the detection apparatus, and the distance between the reference image and the image reflects the focus error.

Conveniently, the first focus error detection path has a lower $\Delta Z/\Delta\theta$ ratio, whereas $\Delta Z$ reflects the distance between an image and a reference image and $\Delta\theta$ reflects the orientation of the first light component to an optical axis of the focus error detection apparatus. When in-focus both $\Delta Z$ and $\Delta\theta$ are substantially zero.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1A:
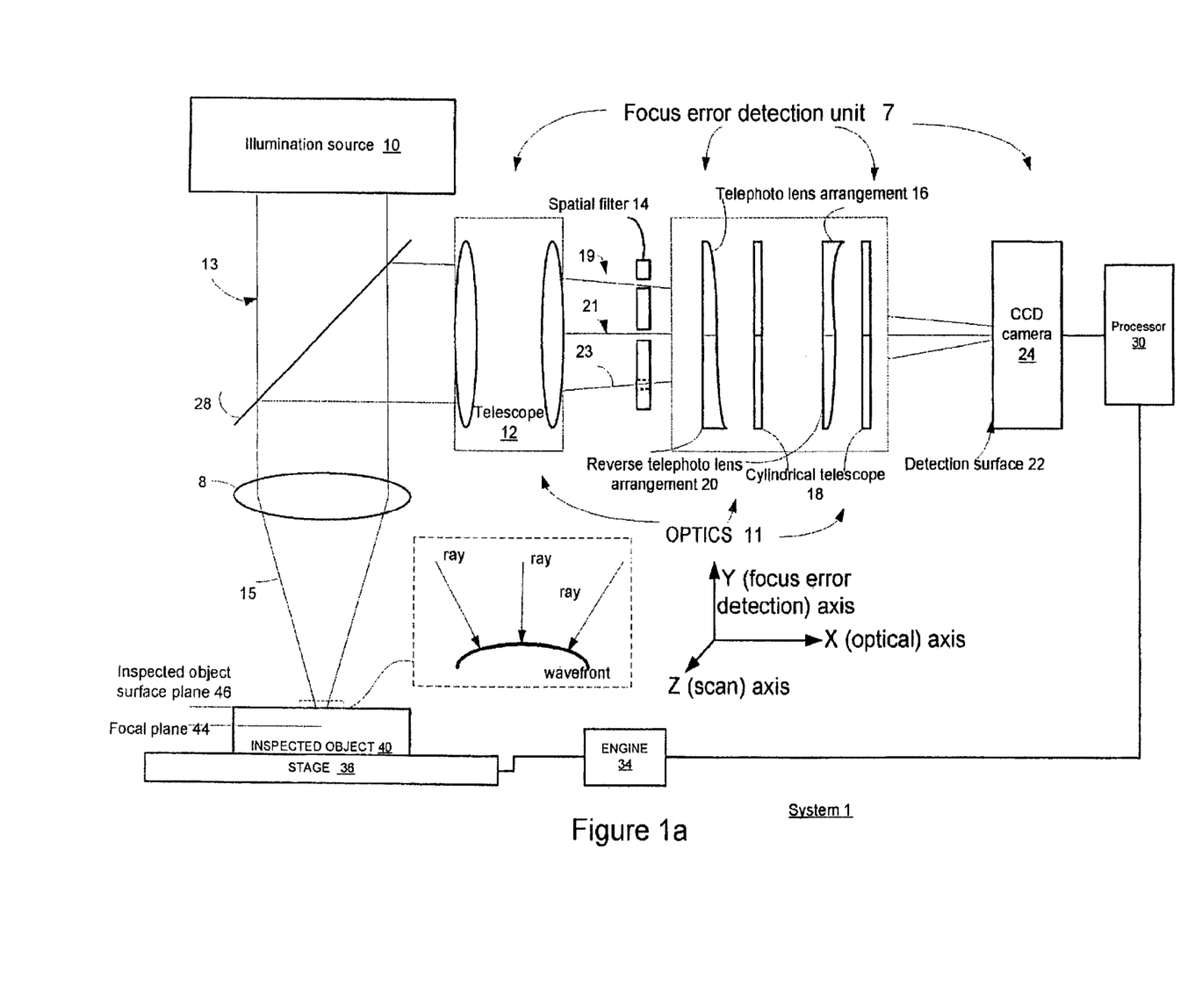
FIGS. 1a–1c are schematic illustrations of the main components of a system utilizing an apparatus, in accordance to an embodiment of the invention.
Figure 1B:
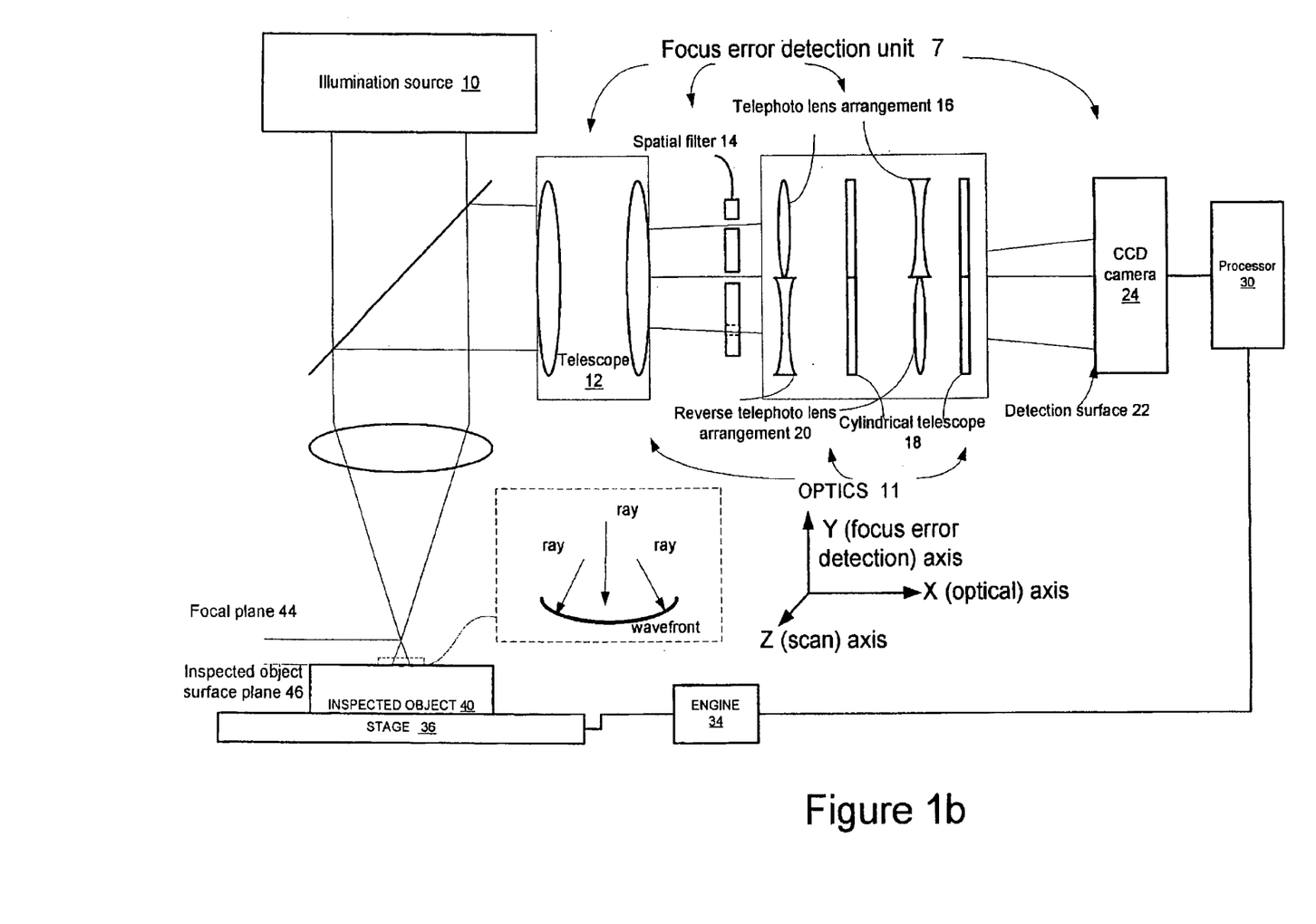
Figure 1C:
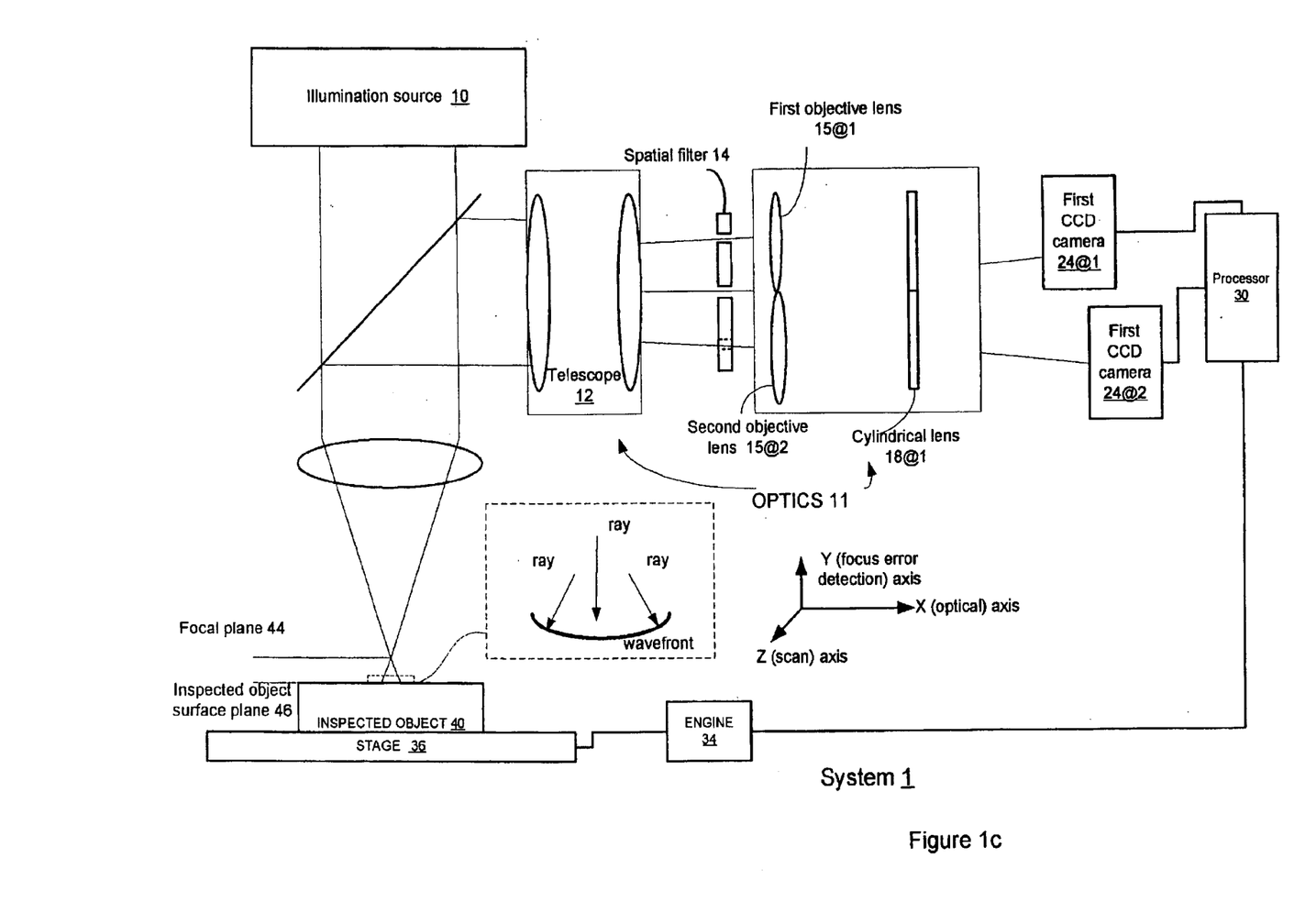

Reference is first being made to FIGS. 1a–1c illustrating a cross section of optical inspection system, generally designated 1, associated with an inspected object, such as wafer 40.

System 1 of FIG. 1a includes: (i) illumination source 10, (ii) focusing collecting optics, such as objective lens 8, (iii) focus error detection apparatus 7 (iv) processor 30, (vi) engine 34 and (vii) stage 36.

Figure 1D:
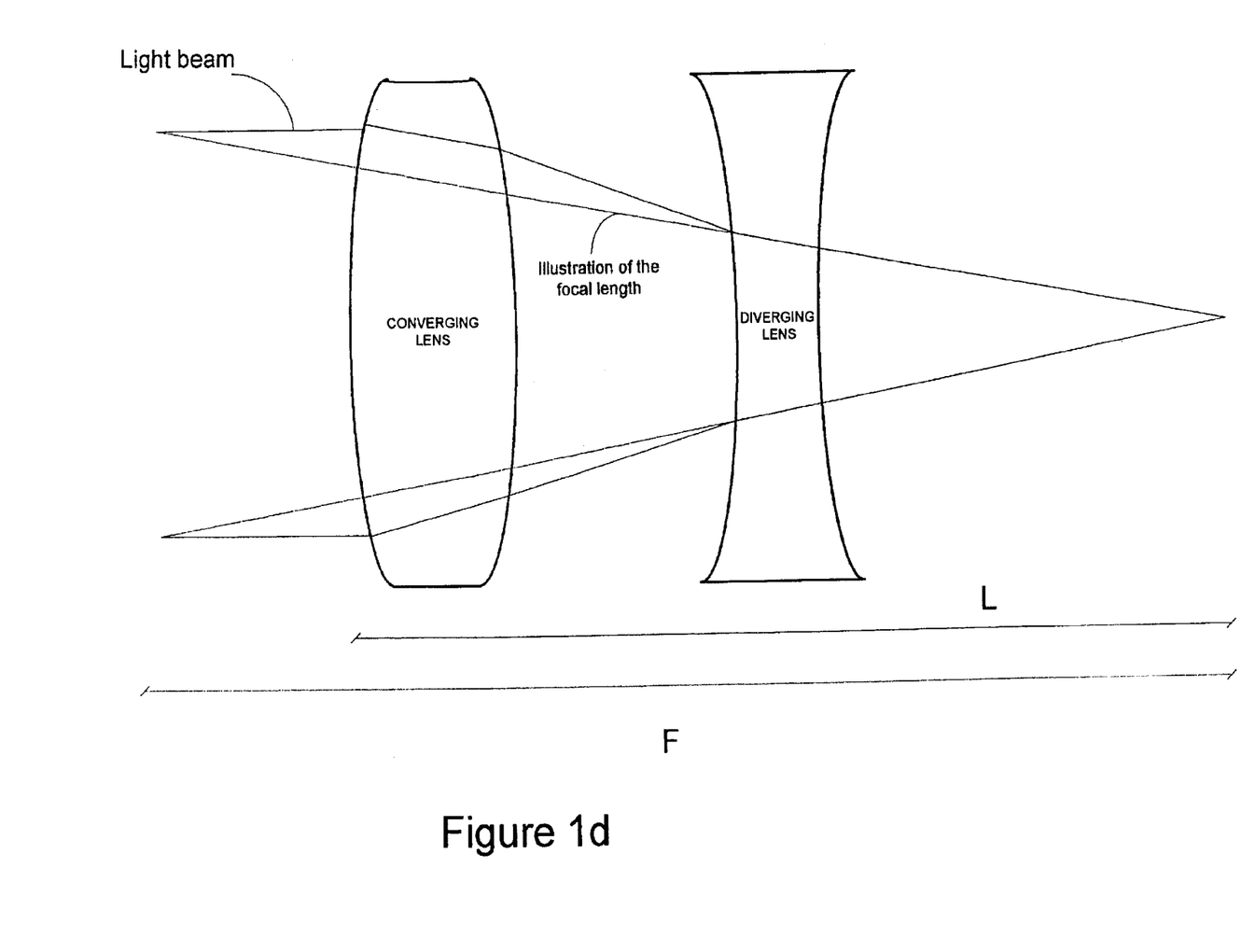
FIGS. 1d–1e illustrate a reverse telephoto lens arrangement and a telephoto lens arrangement of the apparatus of FIGS. 1a–1b, in accordance to an embodiment of the invention.
Figure 1E:
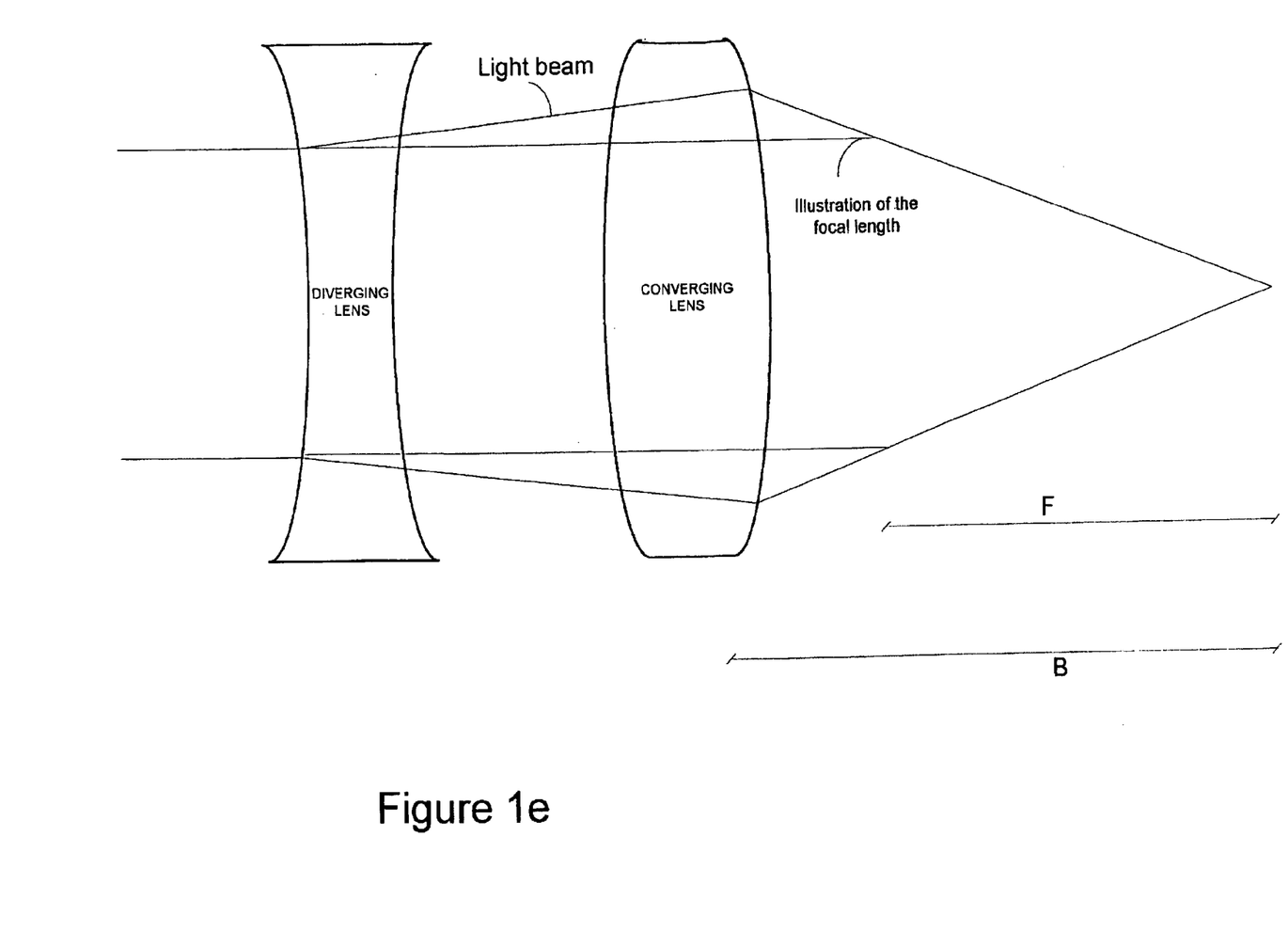

Focus error detection apparatus 7 includes optics 11 and a detector (CCD camera 24). Optics 11 of FIG. 1a includes telescope 12, spatial filter 14, two composite lenses that form a reverse telephoto lens arrangement 20 and a telephoto arrangement 16, and cylindrical telescope 18. The at least one detection apparatus of FIG. 1a includes a CCD camera 24. Telephoto lens arrangements and reverse telephoto arrangements are known in the art. A brief description of these arrangements is found at "Modern lens design" by W. J. Smith, McGraw Hill 1992, pages 147–168 (reverse telephoto lenses) and pages 169–182 (telephoto lenses). A reverse telephoto arrangement includes a diverging lens that is followed by a converging lens that is positioned in parallel to the diverging lens. A telephoto arrangement includes a converging lens that is followed by a diverging lens that is positioned in parallel to the converging lens. FIGS. 1d–1e illustrate a reverse telephoto lens arrangement in which the back focal length B (the distance between the closest lens to the focal point of the reverse telephoto lens arrangement) is longer than the effective focal lens F, and a telephoto lens arrangement in which the effective focal length F is longer than the overall length of the lens L (the distance between the converging lens to the focal point of the telephoto lens arrangement).

FIG. 1a illustrates optics 11 that includes: (i) two lens that define telescope 12, telescope 12 generates a de-magnified image formed at the exit pupil of objective lens 8 at the plane of spatial filter 14, the de-magnification is required to match the exit pupil size (i.e. the size of the aperture stop defined by objective lens 8) to the target size (i.e. sensing surface 22 of the CCD camera 20), (ii) spatial filter 14, conveniently positioned at the y-z plane and having a center at the optical axis of the returned light beam, (iii) a first composite lens that includes a converging upper half and a diverging lower half, (iv) a first cylindrical telescope, (vii) a second composite lens that includes a converging lower half and a diverging upper half, (iv) a second cylindrical telescope. The sensing surface 22 of CCD camera 24 is located at the focal point of the second composite lens. All lenses are parallel to each other and are located at the y-z plane and define an optical axis that coincides with the X axis.

FIG. 1b illustrates optics 11 in which the upper halves of the first and second composite lens are replaces by a converging lens and diverging lens, respectively, and the lower halves of the first and second composite lens are replaces by a diverging lens and a converging lens, respectively.

System 1 may also include at least one detector, such as bright field detector, dark field detector, gray field detector, or a combination of said detectors, and may also include a spatial filter, but this is not necessarily so. The typical positions of a dark field detector and bright field detector are illustrated at U.S. Pat. No. 6,124,924 of Feldman and are well known in the art.

Optics 11 and CCD camera 24 define a first focus error detection path and a second focus error detection path. The first focus error detection path includes the upper half of telescope 12, the upper half of spatial filter 14, the telephoto lens arrangement 16, the upper half of cylindrical telescope 18 and the upper (right hand) half of detection surface 22. The second focus error detection path includes the lower half of telescope 12, the lower half of spatial filter 14, the reverse telephoto lens arrangement 20, the lower half of cylindrical telescope 18 and the lower (left hand) half of detection surface 22. The first focus error detection path detects focus errors with a greater sensitivity than the second focus error detection path, while the second focus error detection path detects focus errors over a greater focus error range than the first focus error detection path. The difference between the sensitivity and dynamic range of the two paths results from the difference of the effective focal length of the reverse telephoto lens arrangement (which is smaller than the distance between the telephoto lens arrangement and the detection surface) and between the effective focal length of the telephoto lens arrangement (which is larger than the distance between the reverse telephoto lens arrangement and the detection surface). The difference may also (or alternatively) result from selecting (by means of spatial filtering) light components that are located at different distances (along the focus error detection axis) from the optical axis of light returned from the inspected object.

The illumination source 10 usually includes a light emitter (such as a laser source) that is followed by a collimating means and a scanner. The scanner receives a collimated light beam and scans the collimated light beam along a scan path to provide input beam 13. The scanner may be an acousto-optic element, a mirror, or the like, and is operable to scan along a scan path that is conveniently perpendicular to the plane of FIGS. 1a–1c. It is assumed that the input light beam is scanned along the Z axis.

Wafer 40 is typically located on a stage 36. A relative displacement between the light beam and wafer 40 is introduced by both scanner and stage 36. Typically, stage 36 translates wafer 40 along a cross-scan axis (such as x axis), while the scanner scans input light beam 13 along a scan axis, (such as z axis), but this is not necessarily so as other means for introducing the relative displacement are known in the art. It is further noted that the cross scan and scan axis may be perpendicular to each other, but this is not necessarily so.

Input beam 13 passes (substantially unaffected) through beam splitter 28 and (as illustrated by lines 15 representative of the incident light beam and reflected light beam that propagate along opposite directions) is focused by objective lens 8 to a focal plane 44 that may be: (i) above the inspected object surface plane 46 (as illustrated in FIG. 1c); (ii) below the inspected object surface plane 46 (as illustrated in FIG. 4a), or (iii) may coincide with the inspected object surface plane 46. Case (i) is referred to as "after focus", case (ii) is referred to as "before focus", an in both cases a focus error occurs and system 1 must detect the focus error and correct it by translating stage 36 along the focus error axis. Alternatively or additionally, objective land 8 may be translated along the focus error axis.

As further illustrated by FIGS. 1a–1c, when "after focus" occurs the wave front of the reflected light is concave, when "before focus" occurs the wave front of the reflected light is convex. When in-focus the wave front is substantially flat.

The incident light bean interacts with the surface of the inspected object and is both scattered (to be collected by dark filed detector) and returned. The returned light is collected by objective lens 8. The returned light beam 15 is directed towards beam splitter 28 that separates the input light beam 13 and the returned light beam 15 and directs the returned light beam towards optics 11 and CCD camera 24 along an optical axis that coincides with the X axis.

Returned light, and especially two light components of returned light pass through optics 11 to form images upon the detection surface of CCD camera 24. In response, CCD camera 24 generates detection signals indicative of a focus error and provides the detection signals to processor 30. Processor 30 determines the focus error in response to the detection signals, and may send a correction signal to engine 34 for translating the stage 36 along the focus error axis to compensate for the detected focus error.

Objective lens 8, beam splitter 28, telescope 12 and spatial filter 14 are located such as to produce, at the plane of spatial filter 14, a de-magnified and conjugate image of the exit pupil of objective lens 8. In other words, focus error information that is embedded in the wave front at the inspected object surface plane 46 is present in the plane of the spatial filter 14.

Figures 2A, 2B, 2C:
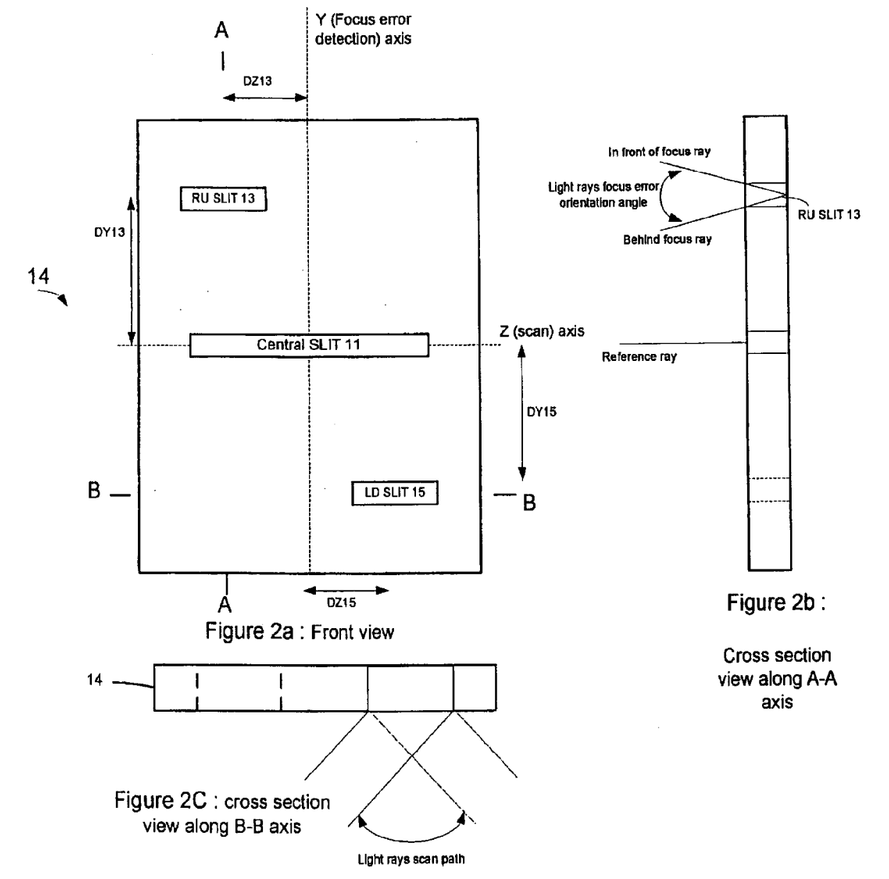
FIGS. 2a–2c illustrate a spatial filter of the apparatus for determining focal error, in accordance to an embodiment of the invention.

As further illustrated at FIGS. 2a–2c, spatial filter 14 has three slits upper-right slit (denoted RU slit) 13, central slit 11 and lower-left slit (denoted LD slit) 15 for passing a reference light component 21, a first light component 19 and a second light component 23. First light component 19 and reference light component 21 propagate through telephoto lens arrangement 16 and cylindrical telescope 18 and may form a first image 60 and a first reference image 62 on detection surface (as illustrated by FIG. 3), while second light component 23 and reference light component 21 propagate through reverse telephoto lens arrangement 20 and cylindrical telescope 18 and may form a second image 66 and a second reference image 64 on detection surface (as illustrated by FIG. 3).

Figure 3:
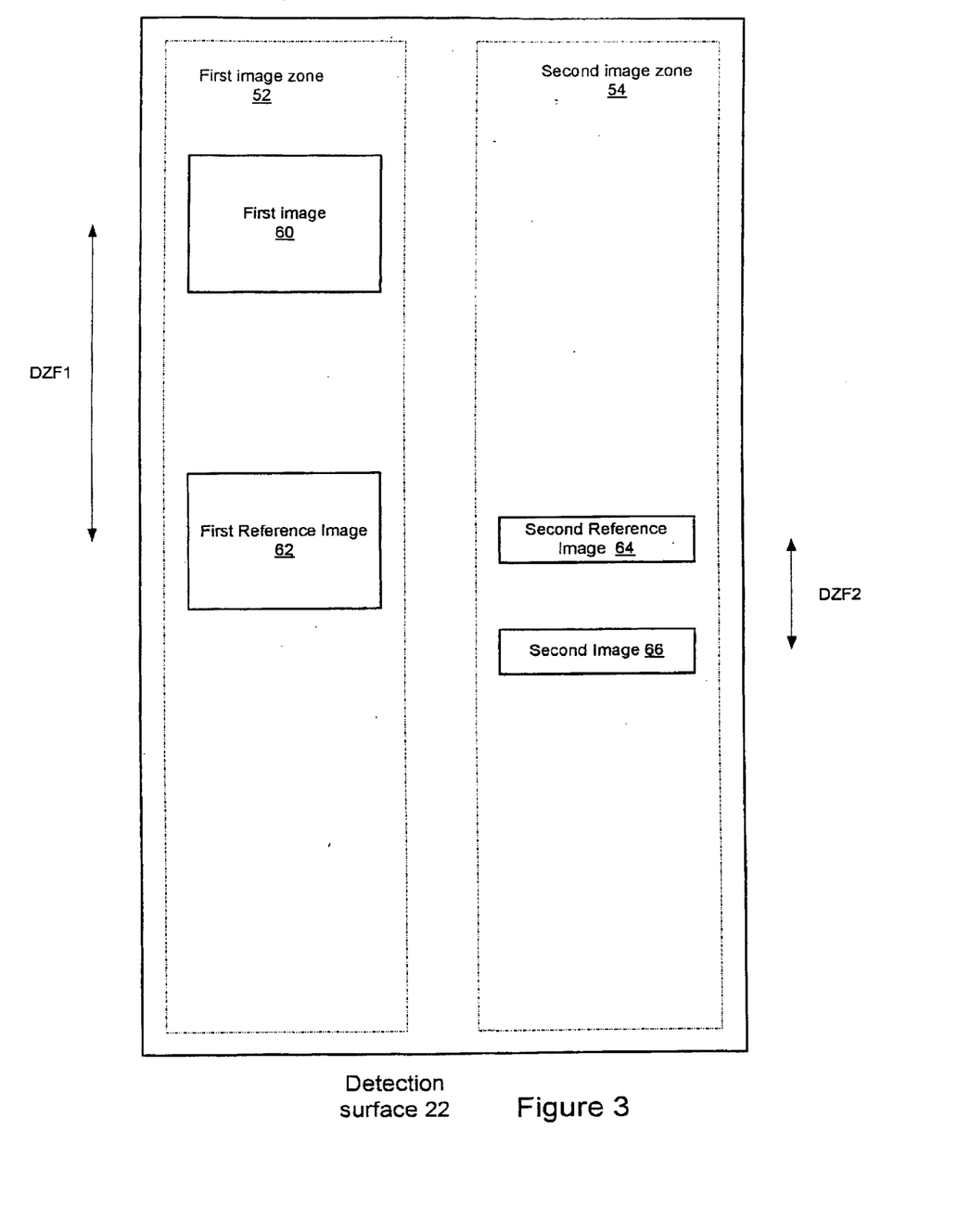
FIG. 3 illustrates a detection surface and images formed upon the detection surface, in accordance to an embodiment of the invention.

FIG. 3 illustrates an "after focus" case. It is noted that the distance DFZ1 between the first image 60 and the first reference image 62 is larger than the distance DFZ2 between the second image 66 and the second reference image 64, as the first focus error detection path is more sensitive than the second focus error detection path. It is noted that due to the higher sensitivity of the first focus error correction path, focus error that are above a predefined threshold will cause the first image 66 to be projected above the detection surface, thus only the reference images 62 and 64, as well as the second image 64 appear on the detection surface 22. In such a case the focus error is learnt from the distance between the second reference image 64 and the second image 66. Usually, when all images appear on detection surface 22 the focus error is driven from the distance between the first image 60 and the first reference image 62.

Referring to FIGS. 2a–2c, illustrating spatial filter 14 in accordance to an embodiment of the invention. Spatial filter 14 has a rectangular shape and is positioned at a plane that is perpendicular to the optical axis of the returned light. This optical axis passes through the center of spatial filter 14, at the intersection point of the focus error detection axis and the scan axis. Spatial filter 14 has three slits—central slit 11, RU slit 13 and LD slit 15. Central slit 11 passes a reference light component. RU slit 13 and LD slit are located in opposite sides of both focus error detection axis and scan axis. It is noted that the distance DY13 between RU slit 13 and scan axis equals the distance DY15 between LD slit 15 and the scan axis, but this not necessarily so. Changes in the said distanced may effect the sensitivity and dynamic range of the first and second focus error detection paths. In other words, locating a slit closer to the scan axis decreases the sensitivity of the path that includes that slit, and vice verse.

FIG. 2b illustrates a cross sectional view of spatial filter 14, along axis A—A that is parallel to focus error detection axis and passes through RU slit 13. FIG. 2b illustrates that the reflected light beam that exits telescope 12 is oriented (in relation to the focus error detection axis) as result from out focus errors.

FIG. 2c illustrates a cross sectional view of spatial filter 14, along axis B—B that is parallel to scan axis and passes through LD slit 15. FIG. 2c illustrates that the reflected light beam that exits telescope 12 is scanned along the scan path that is parallel to the scan axis.

As illustrated by FIGS. 1a–1c, and as further understood by a person skilled in the art there are many ways for implementing error correction paths of varying sensitivity and dynamic range. For example, FIGS. 1a–1b include a single detection apparatus 24 having a single detection surface 22. As the first and second focus error correction paths have the same mechanical length, a difference in the sensitivity may be introduced by using a telephoto lens arrangement and a reverse telephoto lens arrangement. FIG. 1c illustrates a system in which the first focus error detection path ends at a first detection surface of CCD camera 24@1 while the second focus error detection path ends at a second detection surface (of CCD camera 24@2) that is positioned after (more distant that spatial filter 14) the second detection surface. Accordingly, the first and second focus error detection paths may include objective lenses (15@1 and 15@2) having distinct focal lengths. The first detection surface of CCD camera 24@1 is located at the focal length of objective lens 15@1 and the second detection surface of CCD camera 24@2 is located at the focal length of second objective lens 15@1. The focal length of objective lens 15@1 is smaller than the focal length of objective lens 15@2, thus resulting in a lower $\Delta Z/\Delta \theta$ ratio than the second objective lens 15@2. It is further noted that cylindrical lens arrangement 18 of FIGS. 1a–1b was replaced by a single cylindrical lens 18@1.

It is further noted that the central slit 11 is optional, as the location of a reference ray may be determined without using such a slit. It is further noted that the CCD array may be replaced by other detection means, such as but not limited to a plurality of detectors, such as but not limited to Position Sensitive Detectors.

Referring again to FIG. 1a, the sensitivity and dynamic range of system 1 may be further responsive to the magnification or de-magnification of telescope 12. Conveniently, telescope 12 provides a de-magnifies image of the aperture stop of objective lens 8. The cylindrical telescope 18 has two purposes—(i) it prevents the first image and the second image from overlapping when the system in-focus, and (ii) it de-magnifies the scan line (reduces the scan axis trajectory of the first and second images) thus improving the signal to noise ratio of the first and second images.

Those skilled in the art will readily appreciate that various modifications and changes may be applied to the preferred embodiments of the invention as hereinbefore exemplified without departing from its scope as defined in and by the appended claims.

We claim:

1. A focus error detection apparatus operable to receive light reflected from an inspected object and to determine a focus error on a surface of the inspected object, the focus error detection apparatus comprising optics and at least one detection apparatus, whereas the optics and the at least one detection apparatus define at least a first focus error detection path and a second focus error detection path, the first focus error detection path detects focus errors with a greater sensitivity than the second focus error detection path, while the second focus error detection path detects focus errors over a greater focus error range than the first focus error detection path.

2. The focus error detection apparatus according to claim 1 wherein the focus error is determined in response to an inspected image generated by a selected focus error detection path.

3. The focus error detection apparatus according to claim 2 wherein the focus error is further determined in response to a reference image reflecting an in-focus image.

4. The focus error detection apparatus according to claim 2 wherein a first inspected image generated by the first focus error detection path is selected if it is located within a first predefined range on a detection surface of at least one detection apparatus.

5. The focus error detection apparatus of claim 4 wherein the first predefined range is limited by an upper range threshold.

6. The focus error detection apparatus according to claim 1 comprising a spatial filter for directing at least a first light component towards the first focus error detection path and for directing at least a second light component towards the second focus error detection path; whereas the first light component is oriented at a first angle to an optical axis of the focus error detection apparatus and the second light component is oriented at a second angle to the optical axis f the focus error detection apparatus.

7. The focus error correction apparatus according to claim 6 wherein the absolute value of the first angle is smaller than the absolute value of the second angle.

8. The focus error correction apparatus according to claim 6 wherein the first angle is substantially opposite to the second angle.

9. The focus error detection apparatus of claim 6 wherein the spatial filter further directs towards a reference light component towards the first and second focus error detection paths.

10. The focus error detection apparatus of claim 9 wherein the reference light components is substantially parallel to the optical axis of focus error detection apparatus.

11. The focus error detection apparatus of claim 1 wherein the at least one detection apparatus is positioned at a detection plain.

12. The error detection apparatus of claim 1 wherein the first focus error detection path comprises optics that are characterized by a shorter focal length than a focal length of optics of the second focus error detection path.

13. The focus error detection apparatus of claim 1 wherein the first error correction path comprises a telephoto lens arrangement.

14. The focus error detection apparatus of claim 1 wherein the second error correction path comprises a reverse telephoto lens arrangement.

15. The focus error detection apparatus of claim 1 wherein light scans the inspected object across a scan path prior to being reflected.

16. The focus error correction apparatus of claim 15 wherein the scan path is imaged on the at least one detection apparatus as a detected scan path.

17. The focus error correction apparatus of claim 16 wherein the detected scan path is much smaller than the scan path.

18. The focus error correction apparatus of claim 1 wherein the optics comprise a telescope, a spatial filter, a telephoto lens arrangement, a reverse telephoto lens arrangement a cylindrical telescope.

19. The focus error detection apparatus of claim 18 wherein the first path is defined by the telescope, a portion of the spatial filter, the telephoto lens arrangement, and a portion of the cylindrical telescope; and wherein the second path is defined by the telescope, another portion of the spatial filter, the reverse telephoto lens and another portion of the cylindrical telescope.

20. The focus error detection apparatus of claim 19 wherein the telephoto lens arrangement comprises a converging lens followed by a diverging lens.

21. The focus error detection apparatus of claim 19 wherein the telephoto lens arrangement comprises a portion of converging lens followed by a portion of a diverging lens.

22. The focus error correction apparatus of claim 1 comprising a first detection apparatus and a second detection apparatus spaced apart from each other along an optical axis of the focus error correction apparatus; wherein the first detection apparatus is positioned at the end of the first focus error correction path and the second detection apparatus is positioned at the end of the second focus error correction.

23. The focus error detection apparatus of claim 1 wherein the optics includes a beam splitter for splitting light between the first and second focus error detection paths.

24. An optical inspection system comprising:
   an illumination apparatus, for generating a light beam and scanning the light beam;
   a focusing collecting optics, for focusing the scanned light beam towards a focus plane, and for collecting at least a portion of light returned from a surface plane of an inspected object;
   a focus error detection apparatus, for receiving the collected light and for determining a focus error resulting from differences between the focal plane and the surface plane of the inspected object, the focus error detection apparatus comprising optics and at least one detection apparatus, whereas the optics and the at least one detection apparatus define at least a first focus error detection path and a second focus error detection path, the first focus error detection path detects focus errors with a greater sensitivity than the second focus error detection path, while the second focus error detection path detects focus errors over a greater focus error range than the first focus error detection path.

25. The optical inspection system of claim 24 further comprising a processor controlled motor for translating the inspected object such as to compensate for the focus error.

26. A focus error detection method comprising the steps of:
   receiving light that was reflected from an inspected object located at a inspected object plane;
   passing a first light component of the reflected light through a first focus error detection path and passing a second light component of the reflected light through a second focus error detection path; and
   determining a focus error in response to detection signals generated by the first and second focus error detection paths;
   wherein the first focus error detection path detects focus errors with a greater sensitivity than the second focus error detection path, while the second focus error detection path detects focus errors over a greater focus error range than the first focus error detection path.

27. The focus error detection method according to claim 26 wherein the step of determining comprising selecting a focus error detection path.

28. The focus error detection method of claim 26 wherein the detection signals embed at least one image.

29. The focus error detection method according to claim 28 wherein the focus error is reflected by a distance between the image and a reference.

30. The focus error detection method according to claim 27 wherein a first inspected image generated by the first focus error detection path is selected if it is located within a first predefined range on a detection surface of at least one detection apparatus.

31. The focus error detection method of claim 30 wherein the first predefined range is limited by an upper range threshold.

32. The focus error detection method according to claim 30 wherein the step of passing is preceded by a step of spatially filtering the returned light to generate at least the first and second light components.

33. The focus error detection method of claim 32 wherein the first light component is oriented at a first angle to an optical axis of the focus error detection method and the second light component is oriented at a second angle to the optical axis f the focus error detection method.

34. The focus error detection method according to claim 33 wherein the absolute value of the first angle is smaller than the absolute value of the second angle.

35. The focus error detection method according to claim 33 wherein the first angle is substantially opposite to the second angle.

36. The focus error detection method of claim 33 wherein the step of spatial filtering further comprising directs reference light component towards at least one path out of the first and second focus error detection paths.

37. The focus error detection method of claim 36 wherein the reference light components is substantially parallel to an optical axis of focus error detection method.

38. The error detection method of claim 26 wherein the first focus error detection path comprises optics that are characterized by a shorter focal length than a focal length of optics of the second focus error detection path.

39. The focus error detection method of claim 26 wherein the first error correction path comprises a telephoto lens arrangement.

40. The focus error detection method of claim 26 wherein the second error correction path comprises a reverse telephoto lens arrangement.

41. The focus error detection method of claim 26 wherein light scans the inspected object across a scan path prior to being reflected.

42. The focus error detection method of claim 40 wherein the scan path is imaged on the at least one detection apparatus as a detected scan path.

43. The focus error detection method of claim 41 wherein the detected scan path is much smaller than the scan path.

* * * * *